United States Patent [19]

Aufdembrink et al.

[11] Patent Number: 4,935,573
[45] Date of Patent: Jun. 19, 1990

[54] AROMATIZATION PROCESS AND CATALYST UTILIZING A MIXTURE OF SHAPE-SELECTIVE POROUS CRYSTALLINE SILICATE ZEOLITE AND PILLARED LAYERED METAL OXIDE

[75] Inventors: Brent A. Aufdembrink, Wilmington, Del.; Thomas F. Degnan, Yardley; Sharon B. McCullen, Newton, both of Pa.

[73] Assignee: Mobil Oil Corporation, New York, N.Y.

[21] Appl. No.: 314,612

[22] Filed: Feb. 23, 1989

Related U.S. Application Data

[63] Continuation-in-part of Ser. No. 92,249, Sep. 2, 1987, abandoned.

[51] Int. Cl.$^5$ .............................................. C07C 2/52
[52] U.S. Cl. .................................... 585/417; 585/418; 585/419; 585/420
[58] Field of Search ................ 585/417, 418, 419, 420

[56] References Cited

U.S. PATENT DOCUMENTS

| | | | |
|---|---|---|---|
| 3,756,942 | 9/1973 | Cattanach | 208/137 |
| 4,180,689 | 12/1979 | Davies et al. | 585/407 |
| 4,490,569 | 12/1984 | Chu et al. | 585/415 |
| 4,600,503 | 7/1986 | Angevine et al. | 208/251 H |
| 4,637,991 | 1/1987 | Battiste et al. | 501/68 |
| 4,742,033 | 5/1988 | Harris et al. | 502/68 |

FOREIGN PATENT DOCUMENTS

| | | |
|---|---|---|
| 0110628 | 6/1984 | |
| 0205711 | 12/1986 | European Pat. Off. |
| 0225686 | 6/1987 | European Pat. Off. |
| WO8800090 | 1/1988 | PCT Int'l Appl. |

OTHER PUBLICATIONS

A. F. Reid et al., "A New Class of Compounds", Acta Cryst (1963), B24, 1228.
W. A. England et al., "Ion Exchange in the $Cs_x[Ti_{2-x/2}Mg_{x/2}]O_4$Structure", Journal of Solid State Chemistry 49, 300-308 (1983).
I. E. Grey et al., "The Stability and Structure of $Cs_x[Ti_{2-x/4}\ _{x/4}]O_4$, $0.61<x<0.65$", Journal of Solid State Chemistry, 66, 7-19 (1987).
WO8800092 1-14-88 International )PCT) Publication.

Primary Examiner—Curtis R. Davis
Attorney, Agent, or Firm—A. J. McKillop; C. J. Speciale; E. F. Kenehan, Jr.

[57] ABSTRACT

A catalyst composition suitable for use in aromatization of non-aromatic hydrocarbons comprises a shape-selective crystalline silicate such as ZSM-5 and a titanometallate-type layered metal oxide comprising a layered metal oxide and pillars of an oxide of at least one element selected from Groups IB, IIB, IIIA, IIIB, IVA, IVB, VA, VB, VIA, VIIA and VIIIA of the Periodic Table of the Elements separating the layers of the metal oxide where each layer of the metal oxide has the general formula $$[M_x\square_y Z_{2-(x+y)}O_4]^{q-}$$

wherein M is at least one metal of valence n wherein is an integer between 0 and 7, 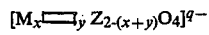 represents a vacancy site, Z is a tetravalent metal, and wherein $$q = 4y - x(n-4)$$

$$0 < x + y < 2$$

23 Claims, 1 Drawing Sheet

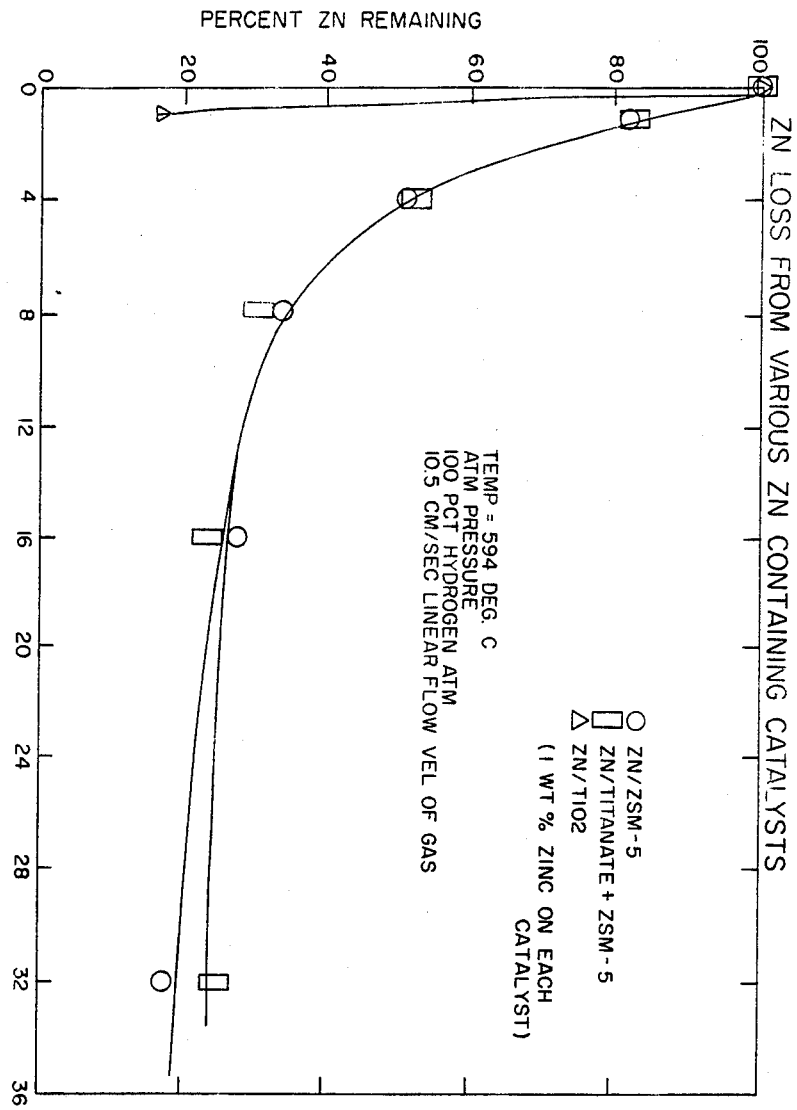

AROMATIZATION PROCESS AND CATALYST UTILIZING A MIXTURE OF SHAPE-SELECTIVE POROUS CRYSTALLINE SILICATE ZEOLITE AND PILLARED LAYERED METAL OXIDE

CROSS-REFERENCE TO RELATED APPLICATION

This application is a continuation-in-part of copending U.S. application Ser. No. 92,249, filed Sept. 2, 1987, and now abandoned, the entire disclosure of which is expressly incorporated herein by reference.

The present invention relates to aromatization of non-aromatic $C_2$ to $C_{12}$ hydrocarbons using a composite catalyst which comprises (a) a shape-selective porous crystalline silicate component such as ZSM-5 and (b) a layered metal oxide of the titanometallate-type intercalated with an interspathic polymeric chalcogenide, e.g., polymeric silica.

The production of aromatic hydrocarbons from non-aromatic hydrocarbons using shape-selective catalyst materials is well-known. U.S. Pat. No. 3,756,942 to Cattanach teaches such a method using a zinc-exchanged ZSM-5. U.S. Pat. No. 4,180,689 to Davies et al teaches conversion of $C_3$–$C_{12}$ hydrocarbons to aromatics using a gallium-activated zeolite such as ZSM-5, ZSM-11, ZSM-12 or ZSM-35 which is gallium-exchanged or gallium impregnated. Although the incorporation of a metal of mild dehydrogenation function such as zinc or gallium activates the catalyst for aromatization reactions, loss of the metal, for example by elution, commonly occurs under the high temperature reducing conditions encountered in aromatization. U.S. Pat. No. 4,490,569 to Chu et al teaches a method to reduce such elution by incorporating gallium as well as zinc into a zeolite aromatization catalyst. All of these U.S. patents are incorporated herein by reference.

It has now been found that loss of the dehydrogenation metal in these aromatization catalysts can be limited by utilizing a composite aromatization catalyst which comprises a shape-selective crystalline silicate and a layered metal oxide of the titanometallate-type, such as titanozincate or titanogallate, containing between its layers a polymeric chalcogenide such as polymeric silica. Since the dehydrogenating metal is present in the framework of the titanometallate-type layered metal oxide, it is relatively resistant to loss by elution or other means. Moreover, the reducing metal in the titanometallate-type layered metal oxide framework is inherently well-dispersed throughout the high surface area material.

The placing of dehydrogenation metal functions on non-zeolite supports such as alumina has generally been avoided in the past for various reasons. Undesirable reactions of the metal with the support can often occur, for example, zinc's formation of a catalytically inactive "spinel" structure with alumina. Moreover, achieving adequate dispersion of the metals on such materials, particularly materials which lack ion exchange capacity, is difficult. Finally, excessive migration of reducing metals which are of relatively low melting point occurs when such metals are associated with amorphous or highly siliceous supports. Accordingly, the discovery of a suitable support for the reducing metal which can be physically combined with a shape-selective crystalline silicate represents a significant advance in the field of aromatization catalysts.

The FIGURE is a graph depicting loss of zinc from various zinc-containing aromatization catalysts, including one of the present invention, over time. Other catalysts set out therein are zinc-impregnated $TiO_2$ and zinc-exchanged ZSM-5.

The present invention relates to a catalyst composition which comprises a) a porous crystalline silicate material, preferably one which is shape-selective (having a constraint index of at least about 1, preferably about 1 to 12), e.g., intermediate pore size zeolites and (b) titanometallate-type layered metal oxide product comprising a layered metal oxide and pillars of a chalcogenide of at least one element selected from Groups IB, IIB, IIIA, IIIB, IVA, IVB, VA, VB, VIA, VIIA and VIIIA of the Periodic Table of the Elements (Fisher Scientific Co. Cat. No. 5-702-10, 1978) separating the layers of the metal oxide, wherein each layer of the metal oxide has the general formula $$[M_x \square_y Z_{2-(x+y)} O_4]^{q-}$$

wherein M is at least one metal of valence n wherein n is an integer between 0 and 7 and preferably is 2 or 3, $\square$ represents a vacancy site, Z is a tetravalent metal, preferably titanium, and wherein $q = 4y - x(n-4)$ and preferably is 0.6–0.9, $0 < x + y < 2$ The metal oxide product contains about 0.5 to about 20 weight percent of said element M, preferably about 1 to 10 weight percent.

The intercalated titanometallate-type layered metal oxide product employed in the present invention comprises a layered titanometallate-type layered metal oxide and interspathic polymeric chalcogenide of at least one element, separating the layers of the metal oxide. Preferably, such materials after pillaring are thermally stable, i.e., capable of withstanding calcination at a temperature of about 450° C. for at least 2 hours without significant reduction (e.g., not greater than 10 or 20%) in the spacing between the layers.

For purposes of the present invention the term "chalcogenide" includes members of the group consisting of oxides, sulfides, selenides, tellurides, and polonides of elements other than those of Group VIB of the Periodic Table of the Elements (Fisher Scientific Co. Cat. No. 5-702-10, 1978). Oxides are particularly preferred as the interspathic polymeric chalcogenide. For present purposes, polymeric chalcogenides are considered to include chalcogenides of two or more repeating units, preferably three or more repeating units, say four or more or even five or more repeating units. The extent of polymerization of the interspathic polymeric chalcogenide is believed to affect the ultimate interlayer separation of the titanometallate-type layered metal oxide product.

In preparing the intercalated layered titanometallate-type layered metal oxide product material used in the catalyst composition, the interlayer spacing of the layered titanometallate-type layered metal oxide material can be tailored by careful selection of the "propping" agent used to separate the layers during treatment with the interspathic polymeric chalcogenide precursors which are eventually converted to the thermally stable polymeric chalcogenide "pillars". Indeed, a wide range of interlayer spacings can be achieved in preparing layered materials of the present invention. Interlayer distances can range anywhere from 2 to 30 angstroms or more, say, e.g., greater than 5, 10, 15 or 20 angstroms, depending largely on the type of "propping" agent used as well as the layered chalcogenide being treated. The titanometallate-type layered metal oxide material when intercalated contains an interspathic polymeric chalcogenide of at least one element selected from Groups IB, IIB, IIIA, IIIB, IVA, IV, VA, VB, VIA, VIIA, and VIIIA of the Periodic Table of the Elements (Fisher Scientific Co. Cat. No. 5-702-10, 1978). For example, the intercalated titanometallate-type layered metal oxide can be prepared by treating the titanometallate-type layered metal oxide which contains ion exchange sites having interspathic cations associated therewith, with an organic compound which is a cationic species or capable of forming a cationic species, to effect exchange with said interspathic cations. An electrically neutral compound capable of conversion to the interspathic polymeric chalcogenide is provided between the layers of the treated layered metal oxide. The compound is then converted to the interspathic polymeric chalcogenide to form the intercalated titanometallate-type layered metal oxide product.

The titanometallate-type layered metal oxide starting material contains ion exchange sites having interspathic cations associated therewith. Such interspathic cations may include hydrogen ion, hydronium ion and alkali metal cation. The starting material is treated with a "propping" agent comprising a source of organic cation such as organoammonium, which may include the cation itself, in order to effect an exchange of the interspathic cations resulting in the layers of the starting material being propped apart. Suitable alkylammonium cations can include n-dodecylammonium, n-heptylammonium, n-hexylammonium and n-propylammonium. The source of organic cation in those instances where the interspathic cations include hydrogen or hydronium ions may include a neutral compound such as an organic amine which is converted to a cationic analogue during the "propping" treatment. The organic cation should be capable of displacing or supplanting the original interspathic cations. In some instances, it may be desirable to remove excess propping agent which is not electrostatically bound within the layered starting material in order to permit the addition of greater amounts of polymeric chalcogenide precursor. Such removal may be effected by washing out the propping agent with a material which is soluble with said propping agent. The foregoing treatment can result in the formation of a titanometallate-type layered metal oxide of enhanced interlayer separation depending upon the size of the organic cation introduced. Contact of the layered metal oxide with the propping agent may be conducted in aqueous medium so that water is trapped between the layers of the "propped" metal oxide.

After the ion exchange, the organic-"propped" species is treated with a compound capable of forming the above-described polymeric chalcogenide. Preferably, such compounds are capable of forming the polymeric chalcogenide upon hydrolysis or other polymerizing reactions. Hydrolyzable compounds are well-suited as such compounds. It is preferred that the organic cation deposited between the layers is capable of being removed from the layered oxide material without substantial disturbance or removal of the interspathic polymeric chalcogenide. For example, organic cations such as n-octylammonium may be removed by exposure to elevated temperatures, e.g., calcination in nitrogen or air, or chemical oxidation conditions, preferably after the interspathic polymeric chalcogenide precursor has been converted to the polymeric chalcogenide in order to form the layered material product employed in the present invention.

The polymeric chalcogenide precursor-containing product can be exposed to suitable conversion conditions, such as hydrolysis and/or calcination to form the titanometallate-type layered metal oxide material of the present invention. The hydrolysis step may be carried out by any suitable method, for example, by utilizing interspathic water already present in organic-"propped" titanometallate-type layered metal oxide material. Because of the effect of interspathic water on hydrolysis, the extent of hydrolysis may be modified by varying the extent to which the organic-"propped" species is dried prior to addition of the polymeric chalcogenide precursor. As noted earlier, the product after conversion to the polymeric chalcogenide form may be exposed to conditions which remove organic compounds such as the organic cation propping agents, e.g., exposure to elevated temperatures such as those encountered by calcining in air or nitrogen.

In one embodiment the titanometallate-type layered metal oxide, exclusive of its interspathic polymeric chalcogenide, has the empirical formula $$K_{0.66}(Zn_{0.35}Ti_{1.49})O_4$$

The catalyst composition of the present invention generally contains between about 5 to 95, preferably between about 10 to 20, weight percent of said intercalated titanometallate-type layered metal oxide and about 5 to 95, preferably about 80 to 90, weight percent of a shape-selective porous crystalline silicate material.

The shape-selective crystalline silicate material employed in the present invention may have the structure selected from the group consisting of ZSM-5, ZSM-5/ZSM-11, ZSM-11, ZSM-12, ZSM-22, ZSM-23, ZSM-35, ZSM-38, ZSM-48, ZSM-57, and ZSM-58, preferably that of ZSM-5.

In a particularly useful composition of the present invention, the titanometallate-type layered metal oxide has the following additional limitations: n=3, M is $Ga^{3+}$, Z is $Ti^{4+}$, y=0 and the interspathic polymeric chalcogenide includes polymeric silica. Another useful composition of the present invention has a layered titanometallate-type layered metal oxide component wherein n=2, M is $Zn^{2+}$, Z is $Ti^{4+}$, y=0 and said interspathic polymeric chalcogenide comprises polymeric silica.

The titanometallate-type layered metal oxide may comprise about 15 to 40 weight percent of the composition of the present invention while the crystalline silicate material may comprise about 60 to 85 weight percent of said composition. The composition may also comprise an inorganic oxide binder, e.g, alumina.

In another aspect, the present invention relates to a process for producing aromatic hydrocarbons which comprises contacting a feed containing non-aromatic $C_2$ to $C_{12}$ hydrocarbons with the composition described above. Such a process can be carried out under any suitable conditions, e.g., at a pressure of about atmospheric to 1000 psig, preferably about atmospheric to 200 psig; a weight hourly space velocity of about 0.05 to 300, preferably about 0.2 to 10; and a temperature of about 204° to 675 ° C., preferably about 315 to 593° C. The feed can be a normally liquid hydrocarbon boiling from about −90° to 230° C. which contains non-aromatic $C_2$ to $C_{12}$ hydrocarbons.

In addition to titanometallate-type layered metal oxide materials, the catalyst used in the process of the present invention comprises a porous crystalline silicate component, such as a zeolite, which may be shape-selective. Zeolitic materials, both natural and synthetic, have been demonstrated in the past to have catalytic properties for various types of hydrocarbon conversion. Certain zeolitic materials include ordered, porous crystalline metallosilicates or metallogermanates having a definite crystalline structure as determined by X-ray diffraction, within which there are a large number of small cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these dimensions have come to be known as "molecular sieves" and are utilized in a variety of ways to take advantage of these properties.

Such molecular sieves, both natural and synthetic, include a wide variety of positive ion-containing crystalline materials as a rigid three-dimensional framework of $XO_4$ and $YO_4$ wherein X is silicon and/or germanium, and Y is one or more of aluminum, gallium, iron, chromium, vanadium, molybdenum, arsenic, manganese, or boron. This framework is comprised of tetrahedra which are cross-linked by the sharing of oxygen atoms whereby the ratio of the total Y and X atoms to oxygen atoms is 1:2. The electrovalance of the tetrahedra containing Y, e.g., aluminum, is balanced by the inclusion in the crystal of a cation, for example, an alkali metal or an alkaline earth metal cation. This can be expressed wherein the ratio of y to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given zeolite by suitable selection of the cation. The spaces between the tetrahedra are occupied by molecules of water prior to dehydration.

The porous crystalline silicates utilized by the present invention include members of a special class of zeolitic materials which exhibit unusual properties. Although these zeolites have unusually low Y atom contents, i.e., high X to Y mole ratios, e.g., high silica-to-alumina molar ratios, they are very active even when the X to Y mole ratio exceeds 30. The activity is surprising, since catalytic activity is generally attributed to framework Y atoms and/or cations associated with these atoms. These materials retain their crystallinity for long periods in spite of the presence of steam at high temperatures which induces irreversible collapse of the framework of other zeolites, e.g., of the X and A type.

An important characteristic of the crystal structure of these porous crystalline silicates is that they provide constrained access to, and egress from, the intracrystalline free space by virtue of having a pore dimension greater than about 5 Angstroms and pore windows of about a size such as would be provided by 10 membered rings of oxygen atoms. It is to be understood, of course, that these rings are those formed by the regular disposition of the tetrahedra making up the anionic framework of the crystalline silicate, the oxygen atoms themselves being bonded to the silicon or aluminum atoms at the centers of the tetrahedra. Briefly, the preferred zeolites useful in this invention possess, in combination an $XO_4$ to $YO_4$ mole ratio, e.g., a silica to alumina mole ratio, of at least about 12; and a structure providing constrained access to the crystalline free space.

The members of the class of intermediate pore size porous crystalline silicates, e.g., zeolites, useful herein have an effective pore size of generally from about 5 to about 8 angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular porous crystalline silicate solely from theoretical structural considerations.

A convenient measure of the extent to which a zeolite provides control to molecules of varying sizes to its internal structure is the Constraint Index of the porous crystalline silicate. Porous crystalline silicates which provide a highly restricted access to and egress from its internal structure have a high value for the Constraint Index, and zeolites of this kind usually have pores of small size, e.g. less than 5 angstroms. On the other hand, porous crystalline silicates which provide relatively free access to the internal porous crystalline silicate structure have a low value for the Constraint Index, and usually pores of large size, e.g. greater than 7 angstroms. The method by which Constraint Index is determined is described fully in U.S. Pat. No. 4,016,218, incorporated herein by reference for details of the method.

Constraint Index (CI) values for some typical materials are:

|  | CI | (at test temperature) |
|---|---|---|
| ZSM-4 | 0.5 | (316° C.) |
| ZSM-5 | 6-8.3 | (371° C.-316° C.) |
| ZSM-11 | 5-8.7 | (371° C.-316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |

| | CI | (at test temperature) |
|---|---|---|
| Zeolite Beta | 0.6–2.0 | (316° C.–399° C.) |

The above-described Constraint Index is an important and even critical definition of those porous crystalline silicates which are useful in the instant invention. The very nature of this parameter and the recited technique by which it is determined, however, admit of the possibility that a given porous crystalline silicate can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular porous crystalline silicate. This explains the range of Constraint Indices for some zeolites, such as ZSM-5, ZSM-11 and Beta.

It is to be realized that while the above CI values typically characterize the specified porous crystalline silicates, such values are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the porous crystalline silicate, the presence of possibly occluded contaminants and binders intimately combined with the zeolite may affect the CI. It will accordingly be understood to those skilled in the art that the CI, as utilized herein, while affording a highly useful means for characterizing the porous crystalline silicates of interest is approximate, taking into consideration the manner of its determination, with the possibility, in some instances, of compounding variable extremes. However, in all instances, at a temperature within the above-specified range of 290° C. to about 538° C., the CI will have a value for any given porous crystalline silicate of interest herein greater than 1, preferably within the approximate range of 1 to 12.

Porous crystalline silicate materials having the structure of zeolite beta, ZSM-5, ZSM-5/ZSM-11 intermediate, ZSM-11, ZSM-12, ZSM-22, ZSM-23, ZSM-35, ZSM-38, and ZSM-48 are examples of porous crystalline silicates for use herein, and are more particularly described in U.S. Pat. Nos. 3,308,069 (zeolite beta), 3,702,886 (ZSM-5), 4,229,424 (ZSM-5/ZSM-11), 3,709,979 (ZSM-11), 3,832,449 (ZSM-12), 4,556,477 (ZSM-22), 4,076,82 (ZSM-23), 4,016,245 (ZSM-35), 4,046,859 (ZSM-38), 4,375,573 (ZSM-48), 4,640,849 (ZSM-50) and 4,698,217 (ZSM-58) respectively, the entire contents of each being incorporated herein by reference.

Another porous crystalline silicate materials having the structure of ZSM-57 is also useful in the present invention.

ZSM-57 is described in copending U.S. application Ser. No. 121,544, the entire disclosure of which is expressly incorporated herein by reference.

Zeolite ZSM-57 may have a ratio of $XO_2$: $Y_2O_3$ of at least 4, wherein X represents silicon and/or germanium and Y represents aluminum, boron, chromium, iron and/or gallium. Preferably, there are from greater than 8 to about 200 moles of $XO_2$ per mole of $Y_2O_3$. Preferably, $XO_2$ is silica and $Y_2O_3$ is alumina. It will be understood that each mole of Y will be associated with one mole of a cation.

A directing agent which has been verified as capable of influencing the formation of zeolite ZSM-57 provided that other sufficient formation conditions are met, is an N,N,N,N',N',N'-hexaethylpentane- diammonium cation, hereinafter also referred to as Hexaethyl-DIQUAT-5. This cation may be supplied to the crystallization mixture, e.g., in the form of a bromide salt.

A means for identifying ZSM-57 is by the X-ray diffraction pattern thereof. It will be understood that not all zeolites of the same structure will generate exactly the same X-ray diffraction data. For example, variations can occur which are attributable to the presence of impurities, e.g., in the form of occluded materials or crystalline intergrowths. The sodium forms in comparison with other cationic forms of otherwise identical zeolites reveal substantially the same patterns with some minor shifts in interplanar spacing and variation in relatiave intensity. Other minor variations can occur, depending on the silicon to aluminum ratio of the particular sample, as well as its degree of thermal treatment.

ZSM-57 has X-ray diffraction lines as set forth in Table 2.

TABLE 2

| d ± delta d(Angstrom) | Intensity Range |
|---|---|
| 11.36 ± 0.23 | M-VS |
| 9.41 ± 0.19 | M-VS |
| 7.12 ± 0.15 | M-S (shoulder) |
| 6.95 ± 0.14 | M-S |
| 5.74 ± 0.12 | M |
| 5.68 ± 0.12 | W-M (shoulder) |
| 5.42 ± 0.11 | M-S |
| 4.81 ± 0.10 | W-M |
| 3.98 ± 0.08 | VW-M |
| 3.84 ± 0.08 | M-S (shoulder) |
| 3.79 ± 0.08 | VS |
| 3.64 ± 0.08 | W |
| 3.55 ± 0.08 | S |
| 3.48 ± 0.08 | S-VS |
| 3.36 ± 0.07 | W |
| 3.14 ± 0.07 | M-S |
| 3.06 ± 0.07 | W |
| 2.949 ± 0.06 | VW |
| 2.316 ± 0.05 | VW |
| 1.935 ± 0.04 | W |

ZSM-57 can be prepared from a reaction mixture containing sources of alkali metal ions (Z), an oxide of Y, an oxide of X, a divalent N,N,N,N',N',N'-hexaethyl-pentanediammonium cation (R), and water. The reaction mixture may comprise an appropriate selection of reactants, capable of forming the zeolite of the present invention, and having a composition falling within the following ranges:

| Reactants | Broad | Preferred |
|---|---|---|
| $SiO_2/Al_2O_3$ | 20–200 | 40–100 |
| $H_2O/SiO_2$ | 10–200 | 20–50 |
| $OH^-/SiO_2$ | 0–3 | 0.1–0.5 |
| $Z/SiO_2$ | 0–3 | 0.1–2 |

-continued

| Reactants | Broad | Preferred |
|---|---|---|
| R/SiO$_2$ | 0.01–2 | 0.1–1 | wherein R and Z are as above defined. The zeolites of the present invention may have a composition, expressed in terms of moles of oxides on an anhydrous basis, as follows:

(0–15)RO:(0–5)Z$_2$O:100SiO$_2$:(0.5–25)Al$_2$O$_3$ wherein R and Z are as defined above.

The divalent N,N,N,N',N',N'-hexaethylpentanediammonium cation may be supplied by suitable compounds of the formula

X(C$_2$H$_5$)$_3$N$^+$(CH$_2$)$_5$N$^+$(C$_2$H$_5$)$_3$X' where X and X' are the same or different and are appropriate counterbalancing anions such as fluoride, chloride, bromide, iodide, hydroxide, acetate, sulfate, carboxylate, etc.

Crystallization of ZSM-57 can be carried out at either static or stirred conditions in a suitable reactor vessel, such as for example, polypropylene jars or teflon lined or stainless steel autoclaves. A useful range of temperatures for crystallization is from about 80° C. to about 350° C. for a time of about 12 hours to about 200 days. Thereafter, the crystals are separated from the liquid and recovered. The composition can be prepared utilizing materials which supply the appropriate oxides. Such compositions may include sodium silicate, silica hydrosol, silica gel, silicic acid, sodium hydroxide, a source of aluminum, and an appropriate organic compound. It should be realized that the reaction mixture component oxides can be supplied from more than one source. The reaction mixture can be prepared either batchwise or continuously. Crystal size and crystallization time of the crystalline zeolite of the present invention will vary with the nature of the reaction mixture employed and the crystallization conditions.

In all cases, synthesis of the crystals of ZSM-57 is facilitated by the presence of at least 0.01 wt. percent, preferably 0.10 wt. percent and still more preferably 1 wt. percent, seed crystals (based on total weight) of crystalline product.

The original cations of the above molecular sieves are preferably replaced in accordance with techniques well known in the art, at least in part, with hydrogen or hydrogen precursor cations and/or non-noble metal ions of Group VIII of the Periodic Table, e.g. nickel, iron and/or cobalt.

Certain titanometallate-type layered metal oxides employed in the present invention are described as well as their method of preparation in U.S. application Ser. No. 879,787, filed June 27, 1986, now U.S. Pat. No. 4,859,648 the entire contents of which are incorporated herein by reference. Such materials are layered titanometallates comprising interspathic polymeric chalcogenide having the general formula A$_x$(M$_{x/n}$Ti$_{2-x/n}$)O$_4$, exclusive of the interspathic polymeric chalcogenide, where A is a monovalent cation and n=1 or 2 provided that: where n=1, 0 is less than x is less than 2 and M is a trivalent cation; where n=2, 0 is less than x is less than 4 and M is a divalent cation.

The titanometallate-type layered metal oxides employed in the present invention are described in PCT/US87/01444, filed June 11, 1987, published as WO 88/00090 on Jan. 14, 1988. These materials are more broadly defined as a layered product comprising a layered metal oxide and pillars of an oxide of at least one element selected from Groups IB, IIB, IIIA, IIIB, IVA, IVB, VA, VB, VIA, VIIA and VIIIA of the Periodic Table of the Elements (Fisher Scientific Co. Cat. No. 5-702-10, 1978) separating the layers of the metal oxide, wherein each layer of the metal oxide has the general formula:

$[M_x \square_y Z_{2-(x+y)} O_4]^{q-}$ wherein M is at least one metal of valence n wherein n is an integer between 0 and 7 and preferably is 2 or 3, $\square$ represents a vacancy site, Z is a tetravalent metal, preferably titanium, and wherein $q = 4y - x(n-4)$ and preferably is 0.6–0.9, $0 < x + y < 2$ The layered product described in the preceding paragraph can be prepared by a method which comprises the steps of starting with said layered metal oxide and physically separating the layers thereof by introducing an organic cationic species between the layers at interlayer anionic sites associated with the layered oxide, introducing between the separated layers of the layered oxide a compound capable of conversion to an oxide and then converting said compound to the oxide to form oxide pillars separating adjacent layers of the layered oxide.

It is to be appreciated that the term "layered" metal oxide is used herein in its commonly accepted sense to refer to a material which comprises a plurality of separate metal oxide layers which are capable of being physically displaced away from one another such that the spacing between adjacent layers is increased. Such displacement can be measured by X-ray diffraction techniques and/or by density measurements.

The pillared titanometallate-type layered metal oxide products can have a relatively high interplanar distance (d-spacing), e.g., greater than about 10 Angstrom and preferably greater than 20 Angstrom up to and even exceeding 30 Angstrom. These materials are capable of being exposed to severe conditions such as those encountered in calcining, e.g., at temperatures of about 450° C. for about two or more hours, e.g., four hours, in nitrogen or air, without significant decrease, say, e.g., less than about 10%, in interlayer distance. Furthermore, such pillared oxides can be prepared without the severe dilution often necessary to introduce the interspathic material in prior art techniques of interlayering. Finally, the size of interspathic oxide contained within the final product can be greatly varied because the oxide precursor species is introduced in an electrically neutral form such that the amount of interspathic material incorporated within the titanometallate-type layered metal oxide is not dependent upon the charge density of the original layered oxide. Charge density should be taken into consideration in determining the suitability of the cationic species introduced between the layers in the procedure used to prop open the layers prior to pillaring.

The unpillared titanometallate-type layered metal oxide starting material contains anionic sites having interspathic cations associated therewith. Such interspathic cations may include hydrogen ion, hydronium ion and alkali metal cation.

More specifically, each layer of the titanometallate-type layered metal oxide starting material has the general formula $$[M_x \square_y Z_{2-(x+y)} O_4]^{q-}$$

wherein M is at least one metal of valence n wherein n is an integer between 0 and 7 and preferably is 2 or 3, $\square$ represents a vacancy site, Z is a tetravalent metal, preferably titanium, and wherein $q=4y-x(n-4)$ and preferably is 0.6–0.9, $<x+y<2$ Interposed between the layers of the oxide will be charge-balancing cations A of charge m wherein m is an integer between 1 and 3, preferably 1. Preferably A is a large alkali metal cation selected from the group consisting of Cs, Rb and K and M is a divalent or trivalent metal cation selected from at least one Mg, Sc, Mn, Fe, Cr, Ni, Cu, Zn, In, Ga and Al. For example, M can be both In and Ga. Structurally, these metal oxides are believed to consist of layers of $(M_x \square_y Z_{1-x-y})O_6$ octahedra which are trans edge-shared in one dimension and cis edge-shared in the second dimension forming double octahedral layers which are separated by cations in the third dimension. These materials can be prepared by high temperature fusion of a mixture of (1) metal oxide, (2) alkali metal carbonate or nitrate and (3) tetravalent metal dioxide, e.g., titanium dioxide or by fusion of a mixture of alkali metallate and tetravalent metal dioxide. Such fusion can be carried out in air in ceramic crucibles at temperatures ranging between 600° C. to 1100° C after the reagents have been ground to an homogeneous mixture. The resulting product is ground to 20 to 250 mesh, preferably about 100 mesh, prior to the organic swelling and polymeric oxide intercalation steps.

Further description of layered titanometallate starting materials and their methods of preparation can be found in the following references:

Reid, A.F.; Mumme, W.G.; Wadsley, A.D. Acta Cryst. (1968), B24, 1228; Groult, D.; Mercy, C.; Raveau, B. J. Solid State Chem. 1980, 32 289; England, W.A.; Burkett, J.E.; Goodenough, J.B.; Wiseman, P. J. J. Solid State Chem. 1983, 49 300.

Use of these layered metal oxides as the layered starting material permits inclusion of different metal atoms into the layered starting material being treated which allows potential catalytically active sites to be incorporated in the stable layer itself. Moreover, variable amounts of metal atoms may be added to provide a catalyst with optimum activity for a particular process. Furthermore, the infinite trans-edge shared layer structure of the titanometallates-type layered metal oxides instead of the sheared 3-block structure of, for example, $Na_2Ti_3O_7$, may reduce or eliminate shearing of the layers as a possible mechanism for thermal or hydrothermal decomposition of the calcined intercalated material. These titanometallate-type materials may possess even greater thermal stability than silicotitanate molecular sieves. In addition, the variable charge density on the oxide layer possible for these layered metal oxides due to the various oxidation states of metal oxides, the incorporated metal atom and the varying stoichiometry of the materials, may allow variation in the amount of the organic cationic species which can be exchanged into the material. This, in turn, permits variation of the ultimate concentration of the oxide pillars between the layers of the final product.

The titanometallate-type layered metal oxide starting material is initially treated with a "propping" agent comprising a source of organic cation, such as organoammonium cation, in order to effect an exchange of the interspathic cations resulting in the layers of the starting material being propped apart. Suitable organoammonium cations include n-dodecylammonium, n-octylammonium, n-heptylammonium, n-hexylammonium and n-propylammonium. During this propping or swelling step it is important to maintain a low hydrogen ion concentration to prevent decomposition of the titanometallate-type structure as well as to prevent preferential sorption of hydrogen ion over the propping agent. A pH range of 6 to 10, preferably 7 to 8.5 is generally employed during treatment with the propping agent. After this treatment, it has been found advantageous to wash out excess propping agent using a propping agent-soluble reagent followed by washing with water. For example, ethanol is soluble in and hence suitable for use with an n-octylamine propping agent. Such washing permits greater incorporation of the oxide pillar precursor in the layered metal oxide. The water treatment allows penetration of water into the interlayer spaces which assists in subsequent hydrolysis the oxide pillar precursor.

After the ion exchange, the organic-"propped" species is treated with a compound capable of conversion, preferably by hydrolysis, to pillars of an oxide, preferably to a polymeric oxide. Where the treatment involves hydrolysis, this may be carried out using the water already present in organic-"propped" material. In this case, the extent of hydrolysis may be modified by varying the extent to which the organic-"propped" species is dried prior to addition of the polymeric oxide precursor.

It is preferred that the organic cation deposited between the layers be capable of being removed from the pillared material without substantial disturbance or removal of the interspathic polymeric oxide. For example, organic cations such as n-octylammonium may be removed by exposure to elevated temperatures, e.g., calcination, in nitrogen or air, or by chemical oxidation preferably after the interspathic polymeric oxide precursor has been converted to the polymeric oxide pillars in order to form the titanometallate-type layered metal oxide product employed in the present invention.

The products of the present invention, especially when calcined, exhibit high surface area, e.g., greater than 200, 300, 400 or even 600 m²/g, and thermal and hydrothermal stability making them highly useful as catalysts or catalytic supports, for hydrocarbon conversion processes for example, cracking and hydrocracking.

The titanometallate-type layered metal oxide starting material is initially subjected to a swelling or propping step in which the material is treated with an organic compound capable of forming cationic species such as organophosphonium or organoammonium ion, between the oxide layers. Insertion of the organic cation between the adjoining layers serves to physically separate the layers in such a way as to make the layered material receptive to the interlayer addition of an electrically neutral, hydrolyzable, polymeric oxide precursor. In particular, alkylammonium cations have been found useful in the present invention. Thus C3 and larger alkylammonium, e.g., n-octylammonium, cations are readily incorporated within the interlayer spaces of the layered metal oxide serving to prop open the layers in such a way as to allow incorporation of the polymeric oxide precursor. The extent of the interlayer spacing can be controlled by the size of the organoammonium ion employed so that use of the n-propylammonium cation can achieve an interlayer spacing of 2 to 5Angstrom whereas to achieve an interlayer spacing of 10 to 20Angstrom an n-octylammonium cation or a cation of equivalent length is required. Indeed, the size and shape of the organic cation can affect whether or not it can be incorporated within the layered structure at all. For example, bulky cations such as tetrapropylammonium are generally undesirable for use in the present method while n-alkyl ammonium cations such as those derived from n-alkyl primary amines and $R_3R'N^+$ cations where R is methyl or ethyl and R is an n-alkyl group with at least 5 carbon atoms, are preferred. Preferably treatment with the organic cationic species is conducted in aqueous media so that water is then available to hydrolyze the electrically neutral, hydrolyzable polymeric chalcogenide precursor subsequently introduced into the "propped" product.

Interspathic chalcogenide pillars are then formed between the layers of the propped or swollen layered metal oxide starting material and may include a chalcogenide, preferably a polymeric chalcogenide, of zirconium or titanium or more preferably of an element selected from Group IVB of the Periodic Table (Fischer Scientific Company Cat. No. 5-702-10, 1978), other than carbon, i.e., silicon, germanium, tin and lead. Other suitable chalcogenides include those of Group VA, e.g., V, Nb, and Ta, those of Group IIA, e.g., Mg or those of Group IIIB, e.g., B. Most preferably, the pillars include polymeric silica. In addition, the chalcogenide pillars may include an element which provides catalytically active acid sites in the pillars, preferably aluminum.

The chalcogenide pillars are formed from a precursor material which is preferably introduced between the layers of the organic "propped" species as a cationic, or more preferably, electrically neutral, hydrolyzable compound of the desired elements, e.g., those of group IVB. The precursor material is preferably an organometallic compound which is a liquid under ambient conditions. In particular, hydrolyzable compounds, e.g., alkoxides, of the desired elements of the pillars are utilized as the precursors. Suitable polymeric silica precursor materials include tetraalkylsilicates, e.g., tetrapropylorthosilicate, tetramethylorthosilicate and, most preferably, tetraethylorthosilicate. Where the pillars are also required to include a different polymeric metal oxide, e.g., alumina or titania, a hydrolyzable compound of said metal can be contacted with the organic "propped" species before, after or simultaneously with the contacting of the propped titanometallate with the silicon compound. Preferably, the hydrolyzable aluminum compound employed is an aluminum alkoxide, e.g., aluminum isopropoxide. If the pillars are to include titania, a hydrolyzable titanium compound such as titanium alkoxide, e.g., titanium isopropoxide, may be used. In addition, the chalcogenide precursor may contain zeolite precursors such that exposure to conversion conditions results in the formation of interspathic zeolite material as at least part of the chalcogenide pillars. Pillars of polymeric silica and polymeric alumina or polymeric silica and polymeric titania are particularly preferred.

After hydrolysis to produce the chalcogenide pillars and calcination to remove the organic propping agent, the final pillared product may contain residual exchangeable cations. Such residual cations in the layered material can be ion exchanged by known methods with other cationic species to provide or alter the catalytic activity of the pillared product. Suitable replacement cations include cesium, cerium, cobalt, nickel, copper, zinc, manganese, platinum, lanthanum, aluminum, ammonium, hydronium and mixtures thereof.

The resulting pillared products exhibit thermal stability at temperatures of 500° C. or even higher as well as substantial sorption capacities (as much as 10 to 25 wt% for $H_2O$ and $C_6$ hydrocarbon). Silica-pillared products possess interlayer separations of greater than 12A and surface areas greater that 250 m²/g when divalent metal atoms, e.g., Mg, Ni, Cu and Zn, are present as the metal M of the product. Silica-pillared products incorporating trivalent metal atoms, e.g., Sc, Mn, Fe, Cr, In, Ga and Al can possess interlayer separations of 6 to 15A. The calcined products of the present invention, particularly those containing interspathic polymeric chalcogenides as prepared by the method of the present invention are suited to use as catalysts for petroleum processing owing to their high surface areas, large interlayer openings, thermal stability and the wide variety of metal atoms which may be incorporated therein.

The following examples are given by way of illustration and are not to be construed as limiting this invention in any way.

EXAMPLE 1 - n-HEXANE CONVERSION WITH HZSM-5

A HZSM-5 catalyst was prepared by twice exchanging a conventionally prepared NaZSM-5 material having a silica to alumina molar ratio of about 70 with a 1 $NH_4NO_3$ solution followed by calcining in air at 1000° F. The calcined catalyst was then streamed at 1000° F. with n-hexane at a WHSV of 1.4. The composition of the product from this reaction is summarized in Table 5.

EXAMPLE 2 - n-HEXANE CONVERSION WITH ZnZSM-5 (1% Zn BY WEIGHT)

A 1% Zn containing ZSM-5 catalyst was prepared from a fresh sample of the same calcined HZSM-5 described in Example 1 by means of impregnation with 0.4 g of $Zn(NO_3)_2 \cdot 6H_2O$ in sufficient deionized water to wet the sample. The sample was dried at room temperature and air calcined at 1000° F. for two hours. This catalyst was then streamed with n-hexane at 1000° F. at a WHSV of 1.4. The composition of the products from this reaction is also shown in Table 5.

EXAMPLE 3 - n-HEXANE CONVERSION WITH ZnZSM-5 (8% Zn BY WEIGHT)

An 8% Zn containing ZSM-5 catalyst was prepared in an identical manner as described in Example 2 from a fresh sample of the calcined ZSM-5 described in Example 1. This catalyst was then streamed with n-hexane at 1000° F at a WHSV of 1.4. The composition of the products from this reaction are also shown in Table 5.

EXAMPLE 4 - n-HEXANE CONVERSION WITH A MIXTURE OF SILICA-PILLARED TITANOZINCATE (25% BY WEIGHT AND HZSM-5 (75% BY WEIGHT)

HZSM-5 having a silica to alumina molar ratio of about 70 and acidity of 360 as determined by the alpha test was physically composited in a mortar and pestle with a silica-pillared titanozincate material having the properties shown in Table 6. The weight ratio of zeolite to titanozincate was about 3:1 and the resulting mixture contained about 2.35 weight percent zinc. This material was pelleted and sized to 20/80 mesh and was streamed with n-hexane at 1000° F. at a WHSV of 1.4 on zeolite. Analysis of the products gave the composition shown in Table 5.

The silica-pillared titanozincate material was prepared as follows:

$K_2CO_3$, ZnO and $TiO_2$ were thoroughly ground to form a homogeneous mixture having the stoichiometric $K_{0.80}(Zn_{0.40}Ti_{1.60})O_4$ which was then fired in air in a ceramic crucible at 900° C. for 200 minutes and then at 1050° C. for 720 minutes. The product was then reground and refired under the same conditions. The resulting stiff powder was then ground to about 100 mesh to yield a product analysed as $K_{0.66}(Zn_{0.35}Ti_{1.49})O_4$. The d-layer spacing from X-ray powder diffraction d(A) was measured as 7.83. Excess octylamine (5 mole equiv/mole equiv of titanozincate) was slowly added to a solution of 12% HCl (4.9 equiv HCl/mole) while keeping the temperature of the reaction mixture below 50° C. to form an acidic aqueous octylammonium chloride solution. The titanozincate was then added to the chloride solution and the mixture was heated to reflux for 24 hours. The reaction mixture was cooled, filtered and washed with hot distilled water. The air dried product was a material having the composition $$H_3O_{0.33}{}^+K_{0.33}(NH_3R^+)_{0.56}[Zn_{0.46}Ti_{1.75}]O_4$$

containing 2.68 weight percent N and having a 24.6 A d-layer spacing from the lowest two theta peak in its X-ray diffraction pattern. The formula was calculated from analytical data obtained for the materials, assuming that the $H_3O^+$ of the interlayer can be derived by subtraction of the total cation content (alkali metal plus octylammonium) from that required to balance the charge on the $(M,Ti)_2O_4{}^{n-}$ layers due to incorporation of the transition metal cation. A low $H^+$ concentration was maintained during octylammonium exchange to avoid decomposition of the metallotitanate structure.

The octylammonium-exchanged product was then stirred in EtOH for 2 hours, filtered, and air dried at room temperature for 2 hours. The product was then slurried with $H_2O$ using a blender to ensure maximum mixing of the hydrophobic solid with water. The slurry was then transferred to a beaker and stirred overnight. The mixture was filtered and air dried for 4 hours.

The resulting filter cake was treated with tetraethylorthosilicate (TEOS) (5 g TEOS/g solid) for 72 hours. The pillared material was obtained by filtering this slurry and drying the solid in air. Calcination of the pillared material at 500° C. for about 4 hours in air eliminated octylamine and produced a silica-pillared titanozincate.

Examples 1 to 4 show that the incorporation of zinc either by impregnation of the zeolite or by physically compositing the titanozincate with the zeolite produces a catalyst with an activity and selectivity that is superior to HZSM-5 alone. Comparisons of Examples 2 and 4 show that the titanozincate/ZSM-5 mixture is equivalent in performance to the Zn impregnated ZSM-5 for aromatization of n-hexane. Finally, Examples 2 and 3 show that the aromatics selectivity of Zn-impregnated catalysts is not a strong function of Zn loading.

TABLE 5

Analysis of Products from N-Hexane Conversion

| Example No.<br>Catalyst | 1<br>HZSM-5 | 2<br>1% Zn/ZSM-5 | 3<br>8% Zn/ZSM-5 | 4<br>25/75 Mix |
|---|---|---|---|---|
| Temperature, °C., | 538 | 538 | 538 | 538 |
| WHSV, hr$^{-1}$ | 1.4 | 1.4 | 1.4 | 1.35 |
| Product Composition, wt % | | | | |
| $H_2$ | 1.3 | 4.1 | 2.6 | 3.6 |
| $CH_4$ | 9.8 | 10.3 | 10.7 | 8.4 |
| $C_2H_6$ | 10.8 | 13.4 | 24.3 | 16.9 |
| $C_2{}^{=+}$ Non-Arom. | 41.5 | 16.3 | 12.9 | 13.0 |
| Benzene | 7.1 | 17.5 | 16.5 | 18.0 |
| Toluene | 15.4 | 22.1 | 16.9 | 23.8 |
| Xylenes | 9.7 | 10.8 | 10.4 | 11.5 |
| $C_9{}^+$ Aromatics | 4.2 | 5.5 | 5.6 | 4.7 |
| N-Hexane Conver. | 100 | 100 | 100 | 100 |
| Aromatics Select.* | 36 | 56 | 49 | 58 |
| Extinction Aromatics Selectivity** | 62 | 66 | 56 | 67 |

*Note:
Since n-hexane conversion is 100% in all cases, aromatics selectivity is defined as (wt. % Benzene + wt % Toluene + wt % Xylene + wt % $C_9{}^+$ Aromatics).

**Note:
Aromatics selectivity at extinction assumes that all of the $C_2{}^{=+}$ non-aromatics are completely converted to hydrogen, methane, ethane, and aromatics in the same proportion as that measured in the run. It is therefore defined here as follows:

$$\text{Extinction Aromatics Selectivity} = \frac{\text{Total Aromatics}}{100 - (C_2^{=+} \text{ Non-Aromatics})}$$

TABLE 6

Properties of Titanozincate Molecular Sieve

| Physical Properties | |
|---|---|
| Interlayer Opening | 16.0 A |
| Surface Area, m$_2$/g | 245 |
| Sorption (g/100 g) | |
| $H_2O$ | 15.0 |
| n-Hexane | 8.0 |
| Cyclohexane | 7.8 |
| Chemical Analysis | |

TABLE 6-continued

| Properties of Titanozincate Molecular Sieve | |
|---|---|
| Ti, wt % | 31.0 |
| SiO$_2$, wt % | 20 |
| Zn, wt % | 9.4 |
| Ash, wt % | 92.1 |
| K, wt % | 0.50 |

EXAMPLE 5-C$_6$/C$_7$ NAPHTHA CONVERSION USING GALLIUM-IMPREGNATED ZSM-5

2.5 g of HZSM-5 having a silica to alumina molar ratio of about 70 were impregnated with 0.35 g Ga(NO$_3$)$_3$ . 9H$_2$O in sufficient deionized water to wet the sample, then dried at room temperature and then air calcined at 1000° F. for two hours. The sample was used to process a C$_6$/C$_7$ naphtha, described in Table 7 at 1000° F. and 0.5 LHSV. The product distribution of the reaction is shown in Table 8.

EXAMPLE 6-PREPARATION OF A SILICA-PILLARED TITANOGALLATE (a) Solid State Preparation of Precursor.

Ga$_2$O$_3$ (25.00 g, 0.133 mole), TiO$_2$ (31.95 g, 0.399 mole), and Cs$_2$CO$_3$ (43.43 g, .133 mole) were thoroughly mixed and ground to a homogeneous mixture. The mixture was fired at 910° C. for 12 h after heating to 150° C. for 2 h and 500° C. for 4 h to decompose the reactants. Temperature ramps of 5° C./min were used. After firing, the product was cooled and ground. The x-ray powder diffraction pattern indicated that the product was a mixture of a layered phase previously observed and an additional material, possibly beta-Ga$_2$O$_3$. Analysis of the material gave the following composition: 34%Cs, 24.4% Ga, 20.3% Ti, 99.07% ash.

(b) Swelling with Octylammonium Ion

Concentrated HCl (66.65 g, 0.6912 mole) was diluted to 250 ml with H$_2$O. Octylamine (91.04 g, 0.7052 mole) was added slowly. Forty grams of the sample from (a) were added and the solution was heated to reflux with stirring for 48 h. The solution was filtered, washed with 1500 ml hot H$_2$O and dried in air. The powder x-ray diffraction pattern from 2°-20° 2 theta was obtained and indicated a d-spacing of 23.2 A in the solid.

This material (45.0 g) was stirred in 150 ml EtOH for 2 h, filtered, and air dried. The air dried sample was slurried in 300 ml H$_2$O using a blender to ensure complete wetting of the hydrophobic solid. The slurry was transferred to a beaker and stirred overnight, then filtered and air dried.

(c) Treatment with Tetraethylorthosilicate (TEOS)

The solid from (b) was reslurried in 700 ml H$_2$O for 2 h, filtered and air dried immediately prior to treatment with TEOS to ensure that the interlaminar water was present. The solid (36.94 g) was stirred in 185.0 g TEOS at 80° C. for 24 h. The reaction was carried out under an N$_2$ environment to control the humidity. The reaction mixture was filtered and the solid dried in air to yield 39.66 g (7.4% weight uptake). The process was repeated; however, no weight gain was observed on the second treatment of this sample.

(d) Calcination to Produce a Molecular Sieve

The final product was obtained by calcining the sample at 500° C. in N for 1 h followed by 2 h in air. A 20.5% weight loss was observed during the final calcination. A powder x-ray diffraction pattern of the material showed a low angle at 3.9° 2 theta, indicating a basal spacing of 22.83 A and an interlayer separation of about 15.8 A assuming no degradation of the layer structure upon calcination. Chemical analysis of the material indicated the following composition: 9.47% Ga, 26.5% SiO$_2$, 21.3% Ti, 0.34% Cs, 98.00% ash. The porous solid had a surface area of 266m$^2$/g and absorbed 12.0% H$_2$O, 8.2% cyclohexane and 7.3% n-hexane.

EXAMPLE 7C$_6$/C$_7$ CONVERSION USING HZSM-5/SILICA-PILLARED TITANOGALLATE 7.5 g HZSM-5, SiO$_2$/Al$_2$O$_3$=70.1, were physically mixed in a mortar and pestle with 2.5 g of the silica-pillared titanogallate material of Example 6. The physical mixture of zeolite and titanometallate was pelleted and sized to 20/40 mesh and then used to process the C$_6$/C$_7$ naphtha described in Table 7 at 1000° F. and 0.5 LHSV. The product distributions are compared to those of Example 5 in Table 8.

TABLE 7

| Feedstock Properties | |
|---|---|
| Boiling Range | 180-250° F. |
| Density at 60° F. | 0.6914 |
| Hydrogen, wt. % | 15.55 |
| Sulfur, ppmw | 0.02 |
| Nitrogen, ppmw | 0.02 |
| Paraffins, wt. % | 81.3 |
| Naphthenes, wt. % | 13.3 |
| Aromatics, wt. % | 5.4 |
| C$_5$, wt. % | 2.7 |
| C$_6$, wt. % | 49.8 |
| C$_7$, wt. % | 47.2 |
| C$_8$, wt. % | 0.3 |

TABLE 8

| | Product Distributions | |
|---|---|---|
| Wt. % of Products | Example 5 | Example 7 |
| H$_2$ | 6.6 | 3.9 |
| CH$_4$ | 4.5 | 4.4 |
| C$_2$H$_6$ | 12.3 | 9.5 |
| C$_2$=+ | 21.9 | 40.2 |
| Benzene | 12.4 | 5.5 |
| Toluene | 21.6 | 14.7 |
| Xylenes | 11.8 | 10.2 |
| C$_9$+ | 8.7 | 11.6 |
| Aromatic Selectivity | 69 | 70 |

EXAMPLE 8-COMPARISON OF ZINC ELUTION FROM ZnZSM-5, ZnTiO$_2$ AND SILICA-PILLARED TITANOZINCATE/HZSM-5

A TiO$_2$ catalyst was impregnated with one weight percent zinc by impregnating 10 g TiO$_2$ with 0.3 g of Zn(NO$_3$)$_2$ in deionized water. The sample was evaporated to dryness and then air calcined at 538° C. for two hours.

A sample of ZnZSM-5 from Example 2 (one weight percent Zn) and a sample of the mixture of silica-pillared titanozincate (25 weight percent) and HZSM-5 (75 weight percent) containing one weight percent zinc from Example 4, and the Zn-impregnated TiO$_2$ catalyst were exposed to flowing hydrogen at 1100° F. for up to about 32 hours (atmospheric pressure, 100% hydrogen atmosphere, 10.5 cm/second linear flow velocity of gas. The Zn/TiO$_2$ catalyst lost a significant fraction of its metal in less two hours. After four hours no zinc was detected on the support. In contrast, the silica-pillared titanozincate/ZSM-5 lost its zinc more slowly and appeared to lose a maximum of 75% of the original zinc. Very little additional zinc was lost after 16 hours under the reducing conditions used in these experiments.

The FIGURE depicts the Zn loss from these three various zinc-containing catalysts over a 32 hour period.

EXAMPLE 9-Zn AND Ga ELUTION FROM SILICA-PILLARED TITANOZINCATE AND SILICA-PILLARED TITANOGALLATE

The silica-pillared titanozincate of Example 4 and the silica-pillared titanogallate of Example 6 were tested for their ability to retain Zn or Ga under the reducing conditions employed in Example 8. The results for the silica-pillared titanozincate given below in Table 9 show that Zn is eluted slower than Zn from $TiO_2$ and faster than Zn from the silica-pillared titanozincate/ZSM-5 mixture or ZnZSM-5. The results for the silica-pillared titanogallate set out in Table 10 below show that substantially no gallium was eluted, even after 32 hours. Accordingly, silica-pillared titanogallates appear to be especially well-suited to use under reducing conditions where it is desirable to avoid elution of the metal function.

TABLE 9

Silica-Pillared Titanozincate-Elution Studies
594° C., 200 cc/min $H_2$ at atmospheric pressure

| Hours in $H_2$ | Wt. % Zn | % Zn Remaining |
|---|---|---|
| 0 | 6.2, 5.9 | 100 |
| 1 | 4.5 | 72 |
| 2 | 3.5 | 56 |
| 4 | 0.97 | 15 |
| 8 | 0.33 | 5.3 |
| 16 | 0.25 | 4.0 |
| 32 | 0.18 | 3.0 |

TABLE 10

Silica-Pillared Gallium Titanate Elution Studies
594° C., 200 cc/min $H_2$ at atmospheric pressure

| Hours in $H_2$ | Wt. % Ga |
|---|---|
| 0 | 19.6 |
| 2 | 19.5 |
| 4 | 21.2 |
| 8 | 21.0 |
| 16 | 20.8 |
| 32 | 20.3 |

EXAMPLE 10-PILLARING OF VACANCY TITANATE

In this example, the layered starting material was a titanate having the empirical formula $Cs_{0.7}Ti_{1.82}O_4$. This material contains vacancies at certain titanium sites in the layers and so can be described by the general formula $Cs_{4y}(\Box_y Ti_{2-y})O_4$ wherein $\Box$ is a vacancy site and y is 0.18.

The layered vacancy titanate was prepared by the high temperature solid state reaction of $Cs_2CO_3$ and $TiO_2$ in the stoichiometry of 1:5.2. The $Cs_2CO_3$ employed was ground to fine powder (less than 100 mesh) dried and stored in a vacuum oven at 180° C. The $TiO_2$ employed was used as received. The solids (50g$Cs_2CO_3$ and 63.93g $TiO_2$) were ground to an homogenous mixture which was fired at 650° C. for 10 hours and, after regrinding, was then fired at 950° C. for a further 10 hours. The resultant product was then ground.

30g of the titanate product was then swollen by replacing with octylamine/HCl (mole ratio 1 titanate: 5 octylamine:4.9HCl) for 14 hours. After washing with 1000 ml of water, the product was dried in air overnight.

25g of the swelled titanate was stirred in 300 ml ethanol, filtered and air dried. The dried solid was then slurried in 500 ml water for 24 hours, pillared and air dried overnight. The resultant solid (16.4g) was stirred with 100g of TEOS for 24 hours and the mixture was filtered and air dried to yield 18.5 g of solid product. The required porous molecular sieve was obtained by calcining the product in air at 500° C. for 4 hours. This sieve is then mixed with H ZSM-5 and pelleted, with the resulting material used to process $C_6/C_7$ naptha according to the same procedure described in Example 7.

It is claimed:

1. A process for producing aromatic hydrocarbons which comprises contracting a feed containing non-aromatic $C_2$ to $C_{12}$ hydrocarbons with a catalyst at a pressure of about atmospheric to 1000 psig, a weight hourly space velocity of about 0.05 to 300 and a temperature of about 204° to 675° C., wherein said catalyst comprises (a) a porous crystalline silicate having a Constraint Index of at least about 1 and (b) a titanometallate layered metal oxide material comprising a layered metal oxide and pillars of a chalcogenide of at least one element selected from Groups IB, IIB, IIIA, IIIB, IVA, IVB, VA, VB, VIA, VIIA and VIIIA of the Periodic Table of the Elements separating the layers of the metal oxide, wherein each layer of the metal oxide has the general formula

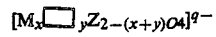

wherein M is at least one metal of valence n wherein n is an integer between 0 and 7, $\Box$ represents a vacancy site, Z is titanium metal, and wherein $$q=4y-x(n-4)$$
$$, ti\ 0<x+y<2$$

2. The process of claim 1 wherein said feed is a normally liquid hydrocarbon boiling from about −90 to 230° C., said pressure ranges from about atmospheric to 200 psig, said weight hourly space velocity ranges from about 0.2 to 20 and said temperature ranges from about 315° to 593° C.

3. The process of claim 1 wherein said Constraint Index is about 1 to 12.

4. The process of claim 1 wherein n is 2 or 3.

5. The process of claim 1 wherein y is zero.

6. The process of claim 1 wherein q is from 0.6–0.9.

7. The process of claim 1 wherein M is selected from the group consisting of Mg, Sc, Mn, Fe, Cr, Ni, Cu, Zn, In, Ga, and Al.

8. The process of claim 6 wherein M is selected from the group consisting of Ga and In.

9. The process of claim 6 wherein M is selected from the group consisting of Fe, Ni and Zn.

10. The process of claim 1 wherein the pillars comprise a polymeric oxide.

11. The process of claim 1 wherein the pillars comprise polymeric silica.

12. The process of claim 1 wherein said catalyst contains between about 5 to 95 weight percent of said titanometallate layered metal oxide and about 5 to 95 weight percent of said porous crystalline silicate material.

13. The process of claim 1 wherein said composition contains between about 10 to 20 weight percent of said titanometallate layered metal oxide and about 80 to 90 weight percent of said porous crystalline silicate material.

14. The process of claim 10 wherein said polymeric oxide comprises polymeric silica and polymeric alumina.

15. The process of claim 10 wherein said polymeric oxide comprises polymeric silica and polymeric titania.

16. The process of claim 1 wherein said porous crystalline silicate material has the structure selected from the group consisting of ZSM-5, ZSM-5/ZSM-11, ZSM-11, ZSM-12, ZSM-22, ZSM-23, ZSM-35, ZSM-48, ZSM-50, ZSM-57 and ZSM-58.

17. The process of claim 16 wherein said porous crystalline silicate material has the structure of ZSM-5.

18. The process of claim 17 wherein M is Ga and said interspathic polymeric chalcogenide is polymeric silica.

19. The process of claim 18 wherein M is Zn and said pillars comprise polymeric silica.

20. The process of claim 19 wherein said titanometallate layered metal oxide comprises about 15 to 40 weight percent of said catalyst and said shape-selective crystalline silicate material comprises about 60 to 85 weight percent of said composition.

21. The process of claim 1 wherein said catalyst comprises an inorganic oxide binder.

22. The process of claim 21 wherein said binder is alumina.

23. The process of claim 17 wherein said feed is a normally liquid hydrocarbon boiling from about -90° to 230° C., said pressure ranges from about atmospheric to 200 psig, said weight hourly space velocity ranges from about 0.2 to 20 and said temperature ranges from about 315° to 593° C.

* * * * *

UNITED STATES PATENT AND TRADEMARK OFFICE
CERTIFICATE OF CORRECTION

PATENT NO. : 4,935,573
DATED : June 19, 1990
INVENTOR(S) : Brent A. Aufdembrink et al It is certified that error appears in the above-identified patent and that said Letters Patent is hereby corrected as shown below:

Column 20, line 35, Claim 1; before "0< X+y< 2" delete ",ti"

Signed and Sealed this

Twelfth Day of November, 1991

Attest:

HARRY F. MANBECK, JR.

*Attesting Officer*     *Commissioner of Patents and Trademarks*